Sept. 2, 1952          C. H. LARSEN          2,609,265
SELF-LEVELING, STORING, AND DISPENSING APPARATUS
Filed March 16, 1949
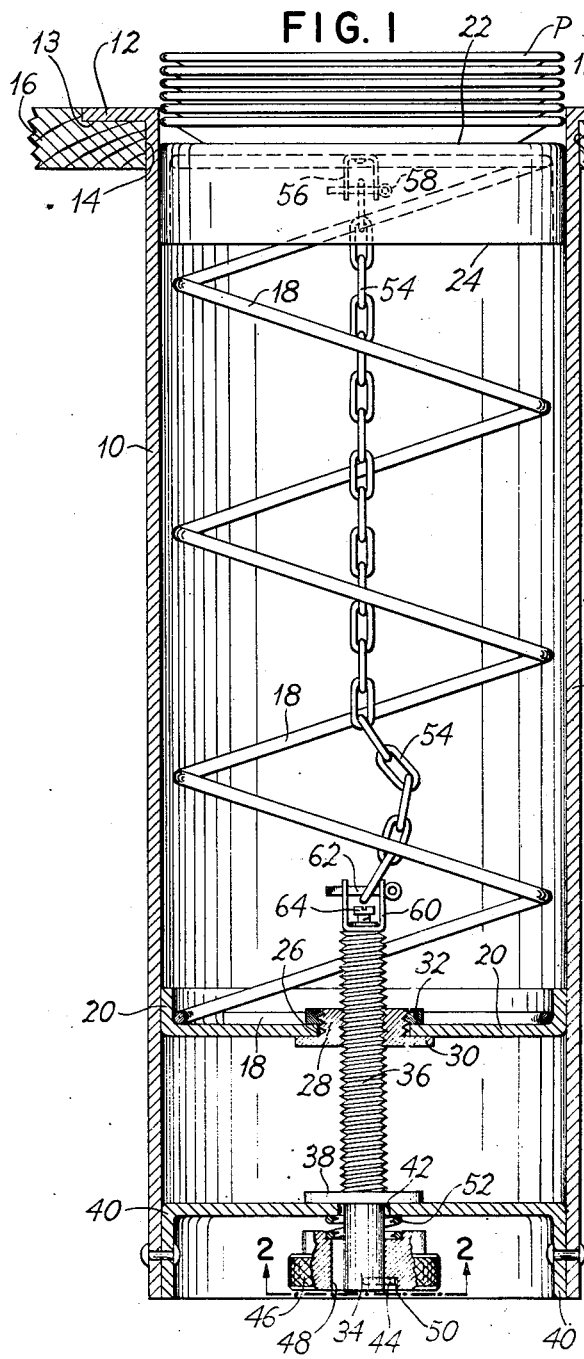
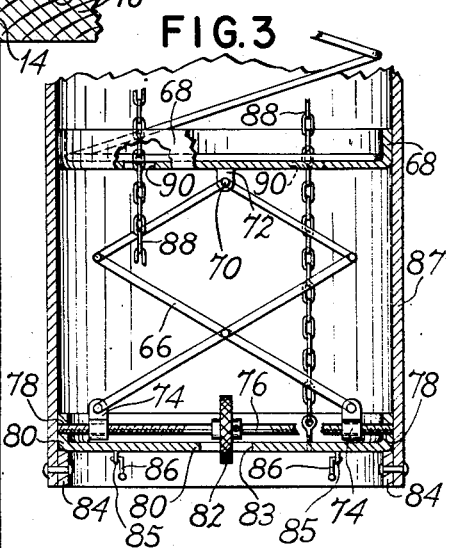
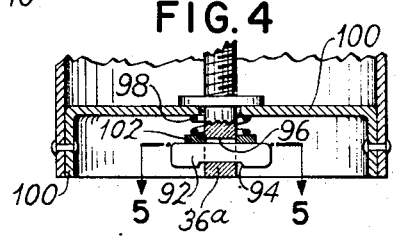
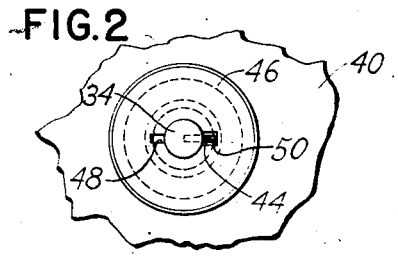
INVENTOR
CARL H. LARSEN
BY *Tennes J Erstad*
ATTORNEY Patented Sept. 2, 1952

2,609,265

UNITED STATES PATENT OFFICE 2,609,265

SELF-LEVELING, STORING, AND DISPENSING APPARATUS

Carl H. Larsen, Brooklyn, N. Y., assignor to American Machine & Foundry Company, a corporation of New Jersey Application March 16, 1949, Serial No. 81,639

3 Claims. (Cl. 312—71)

1

This invention relates to self leveling material receiving, storing and dispensing apparatus and more particularly to improvements in the type of self leveling apparatus such as that shown and described in U. S. Patent 2,226,308, issued to W. J. Gibbs on December 24, 1940.

Heretofore, dispensing and storing units of this self leveling type were difficult to clean due to the calibrated spring urging the carrier to its uppermost position when the unit is empty and the general inaccessibility of the operating mechanism. Since this type of self leveling dispenser is frequently used in cafeterias to store plates, cups and saucers, the problem of cleaning the unit was of necessity of great importance. Another disadvantage of the self leveling dispensers used heretofore was that they could not be regulated to change the height of the uppermost article stored in such a dispenser projected above the top of the counter.

It is therefore an object of this invention to provide a calibrated self leveling dispensing apparatus wherein the number of stored articles extending above the top of the counter level may be changed as the circumstances may require, without interfering with the calibration of the unit.

Another object of this invention is to provide improvements in the construction and design of this type of self leveling apparatus which will enable the unit to be quickly dismantled and taken apart for purposes of cleaning.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Fig. 1 is a sectional side elevation of the self leveling, storing and dispensing apparatus showing the mechanism for changing the height of the material extending above counter level.

Fig. 2 is a plan view of the regulating knob as seen from line 2—2 of Fig. 1.

Fig. 3 is a partial sectional side elevation of a modified form of a self leveling apparatus wherein the height of the stored material may be changed in a similar manner.

Fig. 4 is a partial sectional side elevation illustrating a modified form of the disassembling mechanism, and Fig. 5 is a sectional plan view of the disassembling mechanism taken on line 5—5 of Fig. 4.

2

For purposes of illustration, I have shown how my apparatus may be employed with a storing and dispensing unit similar to that shown in U. S. Patent 2,226,308 referred to above, and in U. S. Patents 2,251,876 and 2,426,995 granted to W. J. Gibbs on August 5, 1941, and September 9, 1947, respectively.

A housing 10 having a flange 12 formed at its upper end supports the unit as it is suspended through an opening 14 formed in a conventional counter 16.

A calibrated spring 18, which may be of a type similar to that disclosed in U. S. Patent 2,426,995, is mounted inside of the cylindrical housing 10 and is supported at its lower end by a spring supporting base 20. At the upper end the spring 18 supports a carrier 22 having a skirted section 24 acting as a guide along the inner side of the cylindrical housing 10. The lower base 20 has an opening 26, to which is secured a supporting member 28 having a flange 30 engaging with the lower side of base plate 20. A vertical post 34 having a threaded portion 36 engages with the threaded hole in the center portion of member 28. At the base of the post's threaded portion 36 is a flange 38 which rests on top of the supporting plate 40.

The center of the supporting plate is provided with a hole 42 which permits the post 34 to extend therethrough. At the bottom of the post 34 is mounted a pin 44 which extends laterally from the post 34. A locking knob 46 having a slot 48 and an indentation 50 which coacts with the pin 44 is inserted over the post 34 and turned so as to bring the indentation 50 into contact with the slot 44. A tension spring 52 is provided to exert pressure between the supporting plate 40 and the adjusting knob 46 so as to maintain the pin 44 in engagement with the indentation 50. The supporting plate 40 is secured to the bottom of the tubular member 10 by suitable means such as welding or riveting.

A chain 54 is connected at its upper end to a bracket 56 carried by the carrier 22 by means of a pin 58. The lower end of chain 54 is connected to a swivel bracket 60 by means of a pin 62. The bracket 60 is loosely connected to the post 36 by means of a screw 64. The chain 54 therefore limits the extent to which the carrier 22 can move upwardly when the unit is empty which in most instances is the level of the counter in which the unit is mounted.

In the modified form of my invention shown in Fig. 3 an elevator 66 acting in a manner similar to a lazy-tong is employed for adjusting the position of the spring supporting base 68 in a manner similar to that done by means of the post 36 shown in Fig. 1.

The upper end of the elevator 70 is connected to a lug 72 carried by the spring supporting base 68 while the lower end of the elevator 66 is connected to lugs 74. Lugs 74 travel on right and left hand threads formed on spindle 76 which is supported at its ends in the upwardly bent edge 78 formed in the supporting plate 80. At the center of the spindle 76 is mounted an adjusting disc 82 partly projecting through an opening 83 of supporting plate 80. By turning disc 82 clockwise or counterclockwise the lugs 74 are moved towards or away from each other to thereby raise or lower the spring support base 68 by means of the elevator 66.

The supporting plate 80 rests on a ring 84 secured to the inner side of the bottom portion of the housing 87. Suitable hooks 86 may be provided if desired to hold the units against the supporting ring 84 when the entire self leveling apparatus is removed from the counter. Chains 88 are secured at their upper ends to a carrier similar to that shown in Fig. 1 and pass through suitable openings 90 formed in the spring supporting base 68. The lower ends of chains 88 are attached to the supporting plate 80.

Another modified form of my invention is shown in Fig. 4 wherein a key or lock plate 92 is used to lock the post 36a in place instead of the knob 46 shown in Fig. 1. The lock plate 92 is formed with an indentation 94 which engages with the bottom of a slot 96 formed at the lower end of the post 36a. A spring 98 is employed for exerting pressure between the base plate 100 and a washer 102 which engages with the top of the lock plate 92.

The operation of my invention may be briefly described as follows:

The housing 10 is installed in the counter 16 by lowering it through the opening 14 until the flanges 12 come to rest in suitable recesses 13 formed on top of the counter 16. Plates P or other material to be stored is then placed on top of the carrier 22. When a sufficient number of plates have been superimposed on the carrier it begins to descend at a uniform rate so that the top of the material is always maintained at a constant level. As described in the self leveling dispensing patents previously referred to, the spring 18 is calibrated to support and counterbalance the weight of a given type of material such as saucers, so that regardless of whether material is added to or removed from the material superimposed on the carrier, the entire load is raised or lowered a correlated distance to always maintain the top of the stored material at a constant level with respect to the top of the counter.

To increase or decrease the distance the top of the superimposed plates or articles extend above or below the level of the counter, an adjustment is made by turning the knob 46 either clockwise or counterclockwise. When the knob 46 is turned it causes, due to the pin 44 engaging with the indentation 50, the post 36 to rotate, thereby moving the threaded member 28 and base 20 up or down, depending upon the direction the knob 46 is turned. It has been found that friction between the base 20 and housing 10 and also the inertia of the base itself is sufficient to maintain it free from rotating when the post 36 is turned.

When the spring supporting base 20 is lowered or raised in this manner the amount of elongation of the spring 18 is not affected, but instead the carrier 22 is raised or lowered a similar distance thereby increasing or decreasing the number of plates P or other material which extend above counter top level.

In the modified form of my invention the device for regulating the number of plates extending about the top of the counter is accomplished in a similar manner except in that case the knob 82 is turned so as to bring together or spread apart the lugs 74 which results in the elevator 66 being contracted or extended. This results in the spring supporting base 90 being raised or lowered a distance sufficient to place the top of the plates P at the elevation desired.

In order to clean the self leveling and storing and dispensing apparatus, the housing 10 is gripped when the unit is empty to lift it out of the counter. The knob 46 is then pressed upwardly to compress spring 52 and is turned to bring the pin 44 into the slot 48. The knob 46 is then free to slip off the post 36. In the modified form of my invention shown in Fig. 4 the apparatus is removed from the counter in a similar manner. In that case however, the lock plate 92 is pressed upwardly and slid out of the slot 96. When the lock plate 92 and the knob 94 have been removed in the manner described the inside operating mechanism can be easily removed by turning the housing 10 upside down so that all of this mechanism slides out thereby enabling the unit and the various component parts to be easily cleaned.

After the unit has been cleaned it is reassembled by reinserting the operating mechanism into the housing 10 and lowering it until the lower end of post 34 passes through the hole 42. The spring 52 is then replaced and the knob 46 is pushed upwardly to compress the spring 52 and then turned until the pin 44 engages with the indentation 50. When the knob 46 is released the spring 52 will force the indentation 50 against the pin 44. The dispensing apparatus is then lowered through the opening 14 in the manner just described until the flange 12 comes to rest in the recess 13.

With respect to the modification shown in Fig. 4 the assembly operation is the same as that just described except that instead of using the knob 56 to secure the post 34 in place a lock plate 92 is inserted into the slot 96 so that the indentation 94 engages with the bottom of said slot 96.

With respect to the modification shown in Fig. 3 the self leveling dispensing apparatus is disassembled in the same manner just described except in this case the hooks 86 are first released from the eyelets 85 of plate 80 to allow the operating mechanism to be removed. When the operating mechanism 86 is reinserted into the housing the hooks are re-engaged to effect a locking of the operating mechanism.

If instead of employing the present apparatus to store and dispense articles such as plates and saucers, it is used to handle items such as frozen foods or articles which have to be laterally supported, it may be preferable to maintain the top of the material at a constant level which is below the top of the dispenser housing. The present invention enables the present unit to be quickly set to facilitate its being used in this manner merely by turning the regulating member in the manner heretofore described.

The invention above described may be varied in construction within the scope of the claims, for the particular device selected to illustrate the invention is but one of many possible embodiments of the same. The invention, therefore is not to be restricted to the precise details of the structure shown and described.

What is claimed is:

1. Apparatus of a self leveling type comprising, a housing, a spring support, a calibrated compression spring supported thereon, a material support mounted at the upper end of said calibrated spring, a single manually turned elevating screw detachably connected to said housing for raising and lowering said spring support, an elongated flexible member interconnecting said carrier with said elevating screw to limit the distance said carrier can move upwardly, and a member detachably connecting said screw to the lower end of said housing.

2. A material supporting apparatus of the self leveling type comprising, a housing, a vertical screw, a stationary support mounted at the bottom of said housing for removably supporting said vertical screw for free rotary movement at the lower end of said housing, a member detachably securing said screw to said stationary support, a spring support mounted in said housing and having a screw receiving member connected to the center portion thereof for receiving said screw, a calibrated compression spring supported on said spring support, material supporting carrier mounted on the upper end of said calibrated compression spring, and a chain interconnecting said carrier with the upper end of said vertical screw to limit the upward distance said carrier can travel with respect to said spring support.

3. Apparatus of the self leveling type comprising, a tubular housing having an upper and a lower end, a material supporting carrier mounted for reciprocable movement in said housing, a calibrated compression spring engaging with the underside of said carrier to raise and lower said carrier a distance varying with the amount of weight supported on said carrier to maintain the top of the material supported thereon at a constant level, a spring support closely fitted to the side of said housing for the lower end of said calibrated spring, a screw receiving member connected to the center of said spring support, a screw engaging with said member to raise and lower the spring support, the calibrated spring, the carrier and the material supported on the carrier a distance required to position the top of said material at the level desired above the upper end of said tubular housing, a support bracket mounted in the lower end of said housing to which the lower end of said screw is removably journaled, an abutment on said screw engaging said bracket for maintaining said screw free from rectilinear movement in one direction in said support bracket, and a device for rotating said screw and releasably connecting the screw to the bracket.

CARL H. LARSEN.

REFERENCES CITED

The following references are of record in the file of this patent:

UNITED STATES PATENTS

| Number | Name | Date |
| --- | --- | --- |
| 399,197 | Hawkins | Mar. 5, 1889 |
| 2,226,308 | Gibbs | Dec. 24, 1940 |

FOREIGN PATENTS

| Number | Country | Date |
| --- | --- | --- |
| 24,917/35 | Australia | Sept. 2, 1936 |